(12) United States Patent
Yen

(10) Patent No.: US 12,174,354 B2
(45) Date of Patent: Dec. 24, 2024

(54) LIGHT PATH CHANGING DEVICE

(71) Applicant: GUANGZHOU LUXVISIONS INNOVATION TECHNOLOGY LIMITED, Guangzhou (CN)

(72) Inventor: Shih-Chieh Yen, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 504 days.

(21) Appl. No.: 17/566,444

(22) Filed: Dec. 30, 2021

(65) Prior Publication Data

US 2022/0121016 A1 Apr. 21, 2022

Related U.S. Application Data

(60) Provisional application No. 63/143,158, filed on Jan. 29, 2021.

(30) Foreign Application Priority Data

Dec. 8, 2021 (CN) .......................... 202111492317.8

(51) Int. Cl.
*G02B 13/00* (2006.01)
*G02B 15/14* (2006.01)
(Continued)

(52) U.S. Cl.
CPC ....... *G02B 13/0065* (2013.01); *G02B 15/143* (2019.08); *G02B 27/646* (2013.01); *G03B 3/10* (2013.01); *G03B 5/00* (2013.01); *G03B 13/34* (2013.01); *G03B 17/17* (2013.01); *G03B 30/00* (2021.01); *H04N 23/57* (2023.01);
(Continued)

(58) Field of Classification Search
None
See application file for complete search history.

(56) References Cited

U.S. PATENT DOCUMENTS 4,249,798 A * 2/1981 Moskovich .... G02B 15/144511
359/683
6,034,819 A * 3/2000 Ogata ................ G02B 27/4272
359/558

(Continued)

*Primary Examiner* — Derek S. Chapel
(74) *Attorney, Agent, or Firm* — Birch, Stewart, Kolasch & Birch, LLP

(57) ABSTRACT

An image sensing device includes a first light path changing element, a second light path changing element, and a plane lens. The first light path changing element includes a first light-incident side and a first light-emergent side, where the first light-incident side faces an image-capturing direction, the first light-emergent side faces a zoom optical axis, and there is an angle between the first light-incident side and the first light-emergent side. The second light path changing element includes a second light-incident side and a second light-emergent side, where the second light-incident side faces the zoom optical axis, the second light-emergent side faces an image-forming direction. An angle is between the second light-incident side and the second light-emergent side. An image-capturing light path passes through the first light-incident side, the first light-emergent side, the second light-incident side, and the second light-emergent side. The plane lens is disposed on the image-capturing light path.

14 Claims, 12 Drawing Sheets

(51) Int. Cl.
  *G02B 27/64* (2006.01)
  *G03B 3/10* (2021.01)
  *G03B 5/00* (2021.01)
  *G03B 13/34* (2021.01)
  *G03B 17/17* (2021.01)
  *G03B 30/00* (2021.01)
  *H04N 23/57* (2023.01)
  *H04N 23/68* (2023.01)
  *H04N 23/69* (2023.01)

(52) U.S. Cl.
  CPC ........... *H04N 23/687* (2023.01); *H04N 23/69* (2023.01); *G03B 2205/0007* (2013.01); *G03B 2205/0046* (2013.01)

(56) References Cited

U.S. PATENT DOCUMENTS

| | | | |
|---|---|---|---|
| 9,681,052 B1* | 6/2017 | Lewkow | H04N 23/6812 |
| 2007/0024739 A1* | 2/2007 | Konno | G02B 13/002 |
| | | | 348/337 |
| 2020/0404181 A1* | 12/2020 | Lee | G03B 30/00 |

* cited by examiner

LIGHT PATH CHANGING DEVICE

CROSS-REFERENCES TO RELATED APPLICATIONS

This application claims the benefit of U.S. provisional application Ser. No. 63/143,158, filed on Jan. 29, 2021 and claims the priority of Patent Application No. 202111492317.8 filed in China, P.R.C. on Dec. 8, 2021. The entirety of the above-mentioned patent applications are hereby incorporated by references herein and made a part of the specification.

BACKGROUND

Technical Field

The present invention relates to an image sensing device, and in particular, to an image sensing device for high magnification zooming.

Related Art

Existing thin electronic devices such as smartphones have a small thickness and limited internal space. When an electronic device needs to be equipped with a high-magnification camera, the optical lens group needs to adopt a periscope design, in which the optical lens group "lies transversely" inside the camera body, to configure an optical lens group with a long light path in the limited internal space. In addition, to increase the magnification, the optical lens group needs to be equipped with a zoom lens group including a plurality of zoom lenses, and a distance between the lenses of the optical lens group is extended as much as possible.

One or more lenses in the zoom lens group need to be moved with a long stroke, to achieve focusing and zooming. To achieve a long-stroke movement, a drive motor also needs to have a sufficient stroke to move the one or more lenses. In addition, to achieve a precise long-stroke movement, a guide rod and a lead screw configured to guide the one or more lenses also need to have high machining precision and high assembly precision, resulting in a high production difficulty.

SUMMARY

In view of this, the inventor puts forward an image sensing device. The image sensing device includes a first light path changing element, a second light path changing element, and a plane lens. The first light path changing element includes a first light-incident side and a first light-emergent side, where the first light-incident side faces an image-capturing direction, the first light-emergent side faces a zoom optical axis, and there is a first angle between the first light-incident side and the first light-emergent side. The second light path changing element includes a second light-incident side and a second light-emergent side, where the second light-incident side faces the zoom optical axis, so that the first light-emergent side and the second light-incident side are disposed opposite to each other along the zoom optical axis; the second light-emergent side faces an image-forming direction, and there is a second angle between the second light-incident side and the second light-emergent side; and an image-capturing light path is formed between the first light path changing element and the second light path changing element, and sequentially passes through the first light-incident side, the first light-emergent side, the second light-incident side, and the second light-emergent side. The plane lens is disposed on the image-capturing light path.

DETAILED DESCRIPTION

Figure 1:
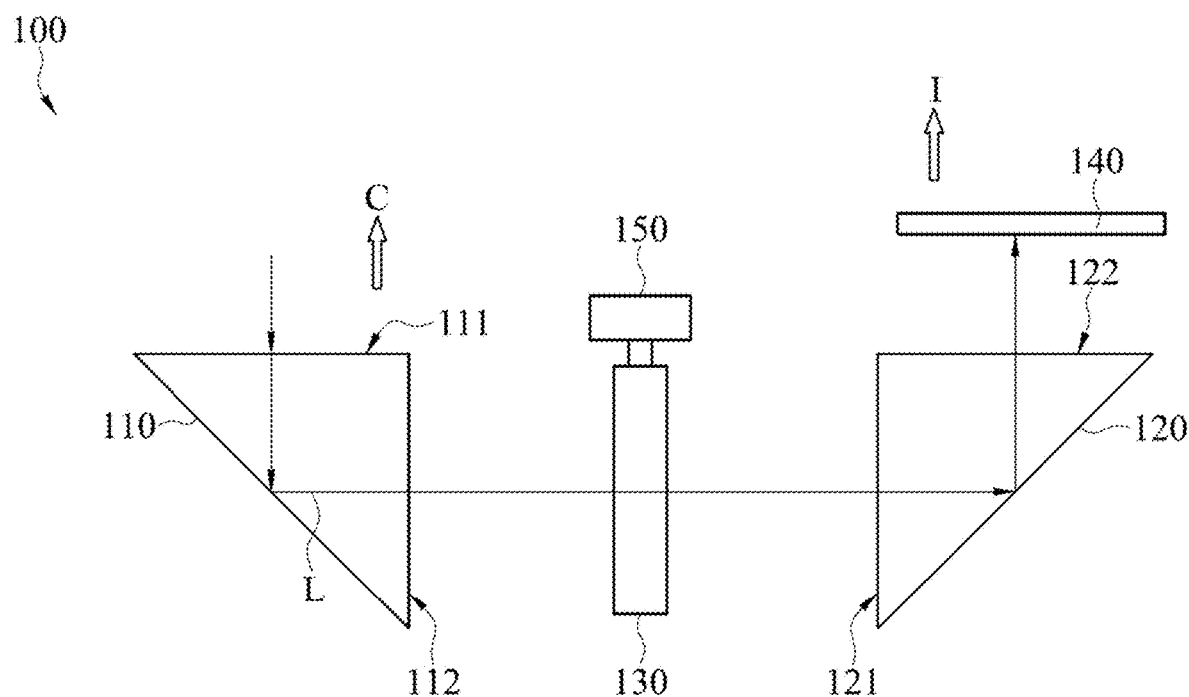
FIG. 1 is a schematic diagram of an image sensing device disclosed in a first embodiment of the present disclosure.

FIG. 1 is a schematic diagram of an image sensing device disclosed in a first embodiment of the present disclosure. Referring to FIG. 1, the image sensing device 100 includes a first light path changing element 110, a second light path changing element 120, and a plane lens 130. The image sensing device 100 is applicable to an electronic device, for example, but not limited to a mobile phone, a tablet computer, or a notebook computer. In the first embodiment, the image sensing device 100 further includes an image sensor 140. The image sensor 140 may be a photosensitive element of the electronic device, such as a charge-coupled device (CCD) or a complementary metal-oxide-semiconductor active pixel sensor (CMOS active pixel sensor), to capture an image according to a photosensitive state and perform encoding to convert the image into a corresponding electronic signal. In some embodiments, the first light path changing element 110, the second light path changing element 120, and the plane lens 130 together form an optical assembly, which cooperates with the independently configured image sensor 140.

Figure 2:
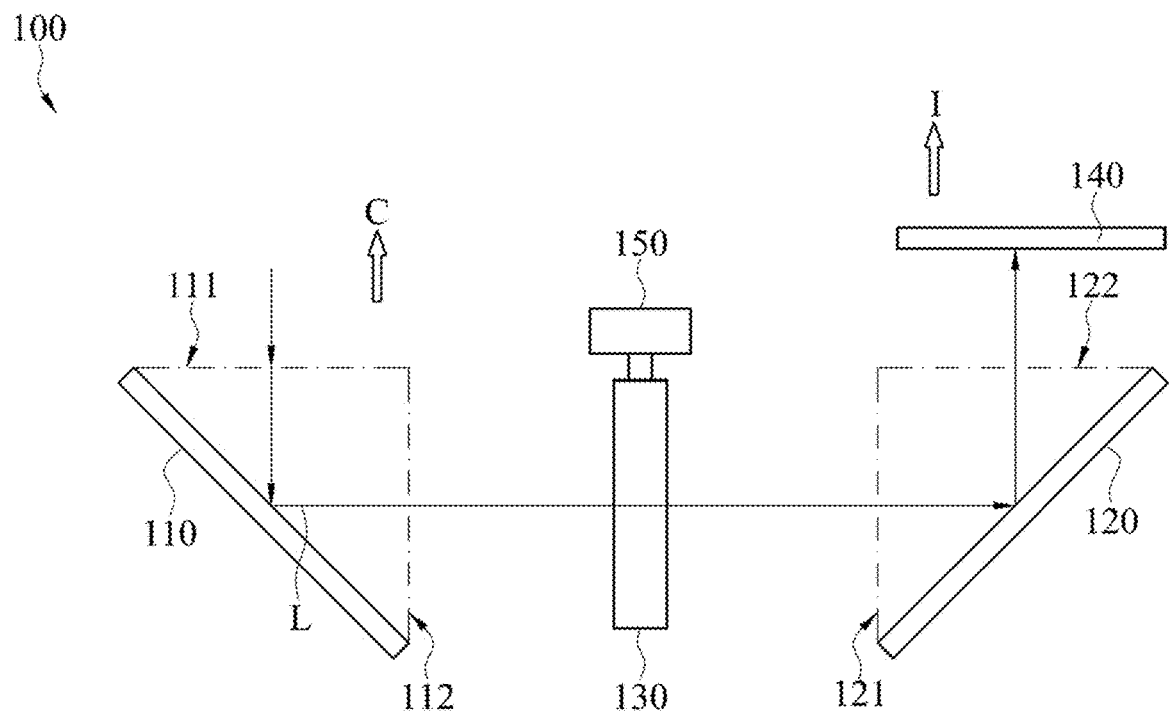
FIG. 2 is a schematic diagram of an image sensing device disclosed in a second embodiment of the present disclosure.

The first light path changing element 110 includes a first light-incident side 111 and a first light-emergent side 112. The first light-incident side 111 faces an image-capturing direction C, and the first light-emergent side 112 faces a zoom optical axis L. There is a first angle between the first light-incident side 111 and the first light-emergent side 112. The first angle may be a 90-degree angle, but other angles are not excluded. In an embodiment, the first light path changing element 110 is a first prism, and the first light-incident side 111 and the first light-emergent side 112 are a first light-incident surface and a first light-emergent surface of the first prism respectively. In a second embodiment, as shown in FIG. 2, the first light path changing element 110 is a first reflector, and is disposed at an angle to each of the image-capturing direction C and the zoom optical axis L, for example, but not limited to a 45-degree angle.

The second light path changing element 120 includes a second light-incident side 121 and a second light-emergent side 122. The second light-incident side 121 faces the zoom optical axis L, so that the first light-emergent side 112 of the first light path changing element 110 and the second light-incident side 121 of the second light path changing element 120 are disposed opposite to each other along the zoom optical axis L. The second light-emergent side 122 faces an image-forming direction I. There is a second angle between the second light-incident side 121 and the second light-emergent side 122. The second angle may be a 90-degree angle, but other angles are not excluded. In an embodiment, the second light path changing element 120 is a second prism, and the second light-incident side 121 and the second light-emergent side 122 are a second light-incident surface and a second light-emergent surface of the second prism respectively. In the second embodiment, as shown in FIG. 2, the second light path changing element 120 is a second reflector, and is disposed at an angle to each of the image-forming direction I and the zoom optical axis L, for example, but not limited to a 45-degree angle. Therefore, the first light path changing element 110 or the second light path changing element 120 may be a prism, a reflector, or a combination thereof. For example, the reflector is attached to an outer surface of a reflecting surface of the prism, or a reflecting surface of the prism is coated with a reflecting film.

An image-capturing light path is formed between the first light path changing element 110 and the second light path changing element 120, and sequentially passes through the first light-incident side 111, the first light-emergent side 112, the second light-incident side 121, and the second light-emergent side 122.

The plane lens 130 may be a metalens or a multi-level diffractive lens (MDL). The plane lens 130 is disposed on the image-capturing light path. In some embodiments, the plane lens 130 is located between the first light path changing element 110 and the second light path changing element 120, and the zoom optical axis L passes through the plane lens 130.

As shown in FIG. 1, the image sensor 140 is disposed corresponding to the second light-emergent side 122 of the second light path changing element 120. That is, the image-forming direction I faces the image sensor 140. Light received by the first light-incident side 111 of the first light path changing element 110 in the image-capturing direction C passes through the first light-emergent side 112, and is focused through the plane lens 130, and the focused light is imaged on the image sensor 140 through the second light-incident side 121 and the second light-emergent side 122.

As shown in FIG. 1 and FIG. 2, the plane lens 130 has a characteristic of a short focal length, and may complete high magnification zooming within a short light path. Therefore, a distance between the first light path changing element 110 and the second light path changing element 120 can be effectively shortened. In some embodiments, the image sensing device 100 further includes a focusing mechanism 150, connected to the plane lens 130, and configured to drive the plane lens 130 to move along the zoom optical axis L to perform focusing and zooming. The focusing mechanism 150 may be a voice coil motor (VCM), a shape memory alloy (SMA) motor, a piezo motor, or a combination of two or more thereof.

Figure 3A:
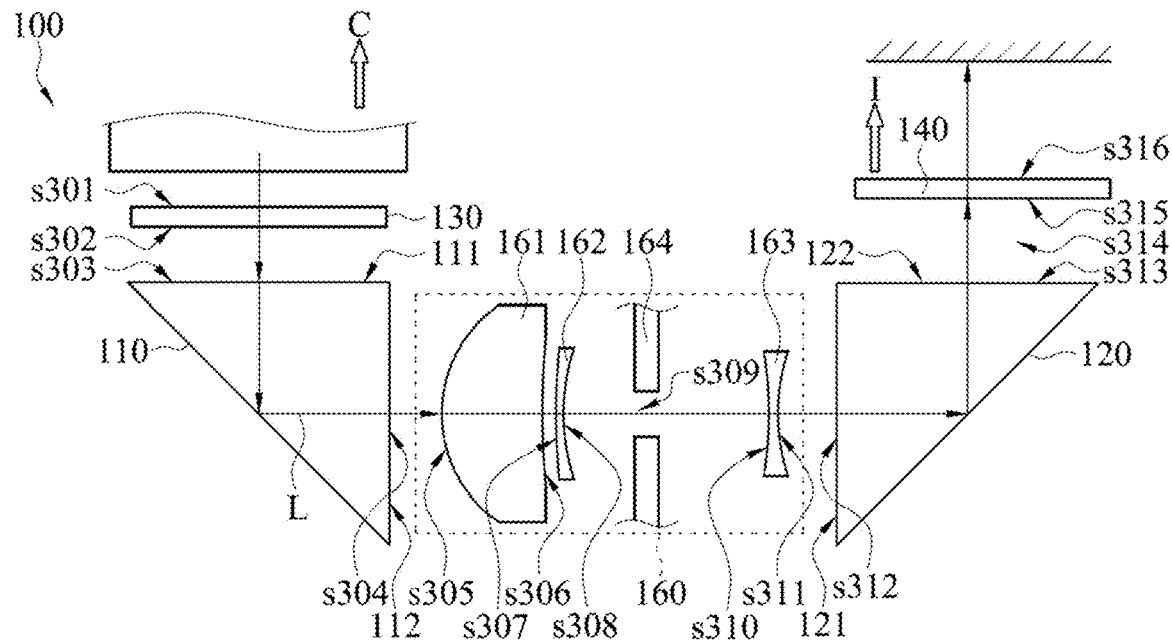
FIG. 3A is a schematic diagram of an image sensing device disclosed in a third embodiment of the present disclosure.

FIG. 3A is a schematic diagram of an image sensing device disclosed in a third embodiment of the present disclosure. Referring to FIG. 3A, the image sensing device 100 includes a first light path changing element 110, a second light path changing element 120, a plane lens 130, and an image sensor 140. In the third embodiment, configurations of the first light path changing element 110, the second light path changing element 120, and the image sensor 140 are substantially the same as those in the first embodiment. In the third embodiment, the plane lens 130 is also disposed on the image-capturing light path, and the plane lens 130 is disposed corresponding to a first light-incident side 111 of the first light path changing element 110. That is, the plane lens 130 is located in an image-capturing direction, and first performs high magnification zooming on incident light, and the first light-incident side 111 of the first light path changing element 110 then receives zoomed and refracted light.

As shown in FIG. 3A, the image sensing device 100 in the third embodiment further includes a lens group 160, including a plurality of lenses, such as lenses 161, 162, and 163. The lens group 160 is located between the first light path changing element 110 and the second light path changing element 120, and the lens group 160 is located on the zoom optical axis L. In an embodiment, the lens group 160 includes a focusing mechanism (not shown in the figure), configured to drive one or more lenses to move along the zoom optical axis L to perform focusing and zooming. Because a function of zooming a magnification is mainly achieved by the plane lens 130, the one or more lenses of the lens group 160 only need to be shifted within a short stroke, thereby effectively reducing a production difficulty, and shortening a length of the image sensing device 100 on the zoom optical axis L. The lenses 161, 162, and 163 of the lens group 160 may be aspheric lenses made of quartz or plastic. In the third embodiment, the lens 161 and the lens 162 are convex-concave lenses, and the lens 163 is a biconcave lens. Table 1 is a lens parameter table of the image sensing device disclosed in the third embodiment of the present disclosure (attached as an appendix at the end of this specification), referring to FIG. 3A supplemented with Table 1. Rows in Table 1 are arranged in an order in which light is projected onto the image sensor 140 after entering the image sensing device 100. For example, light is incident from a surface s301 of the plane lens 130, and is then emergent from a surface s302 of the plane lens 130, and an optical axis path length by which the light passes in the plane lens 130 is 0.5 mm; next, light is incident from the surface s302 of the plane lens 130 to a surface s303 of the first light path changing element 110, and an optical axis path length by which the light passes in a space gap is 0.35 mm; and then, light is incident from the surface s303 of the first light path changing element 110, and is then incident to a surface s304 of the first light path changing element 110 after being reflected in the first light path changing element 110. An optical axis path length by which the light passes in the first light path changing element 110 is 5.8 mm (2.9 mm before reflection+ 2.9 mm after reflection), and the rest may be deduced by analogy. In the third embodiment, the surface s303 and the surface s304 of the first light path changing element 110 are planes, and therefore, curvature radiuses are infinity; and a surface s305 and a surface s306 of the lens 161 are curved surfaces, and curvature radiuses are sequentially 2.922 mm and 455.122 mm.

According to the following sag function (Formula 1), an aspheric lens in the image sensing device 100 is described:

$$Z(s) = \frac{Cs^2}{1 + \sqrt{1 - (1+k)C^2 s^2}} + A_4 s^4 + A_6 s^6 + A_8 s^8 + A_{10} s^{10} + \cdots \quad \text{(Formula 1)}$$

where Z is a surface profile of a surface parallel to the optical axis; s is a radial distance from the optical axis; C is a curvature; k is a conic constant; and $A_4$, $A_6$, $A_8$, and $A_{10}$ are $4^{th}$-order, $6^{th}$-order, $8^{th}$-order, and $10^{th}$-order aspheric coefficients. Table 2 is a coefficient table of an aspheric formula of the image sensing device disclosed in the third embodiment of the present disclosure, referring to Table 1 and Table 2 together supplemented with the foregoing Formula 1. The surface s305 of the lens 161 is used as an example. A profile of the surface s305 is described by using Formula 1, where a conic constant k is 0, $4^{th}$-order, $6^{th}$-order, $8^{th}$-order, and $10^{th}$-order aspheric coefficients are sequentially 5.08E-04, 8.14E-05, 4.17E-06, and -1.69E-07, and a curvature radius is 2.922 mm.

According to the following Binary 2 surface phase formula (Formula 2), the plane lens 130 in the image sensing device 100 is described:

$$\varphi = M \Sigma_{i=1}^{N} A_i \rho^{2i} \quad \text{(Formula 2)}$$

where $\varphi$ is a phase; M is a diffraction order; N is a series of polynomial coefficients; and $A_i$ is a polynomial coefficient in a normalized radial aperture coordinate $\rho^{2i}$, and $\rho$ is an element radius. Table 3 is a coefficient table of the Binary 2 surface phase formula of the plane lens disclosed in the third embodiment of the present disclosure, referring to Table 3 supplemented with the foregoing Formula 2. The surface s301 of the plane lens 130 is used as an example, and a surface phase change of the surface s305 is described by using Formula 2, where $\rho^2$, $\rho^4$, $\rho^6$, and $\rho^8$ are sequentially -2.75E+05, -4.17E+07, -5.04E+10, and -1.17E+13.

Figure 3B:
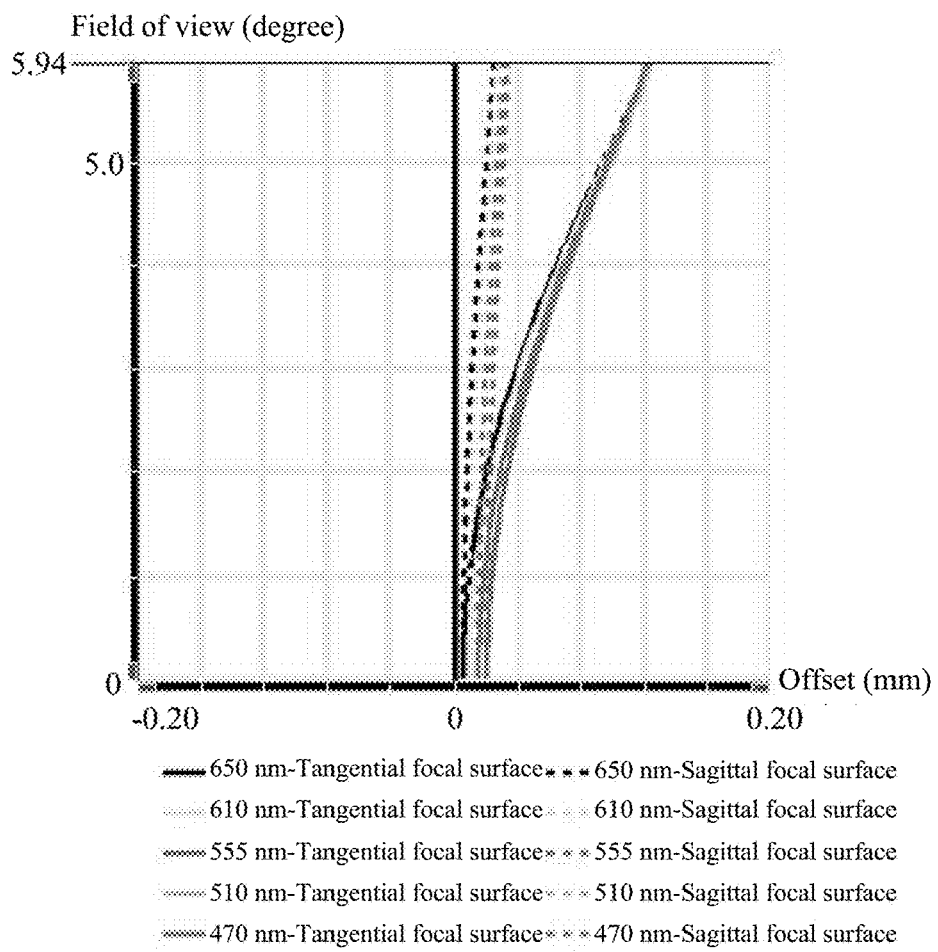
FIG. 3B is an astigmatic field curvature diagram of the image sensing device disclosed in the third embodiment of the present disclosure.
Figure 3C:
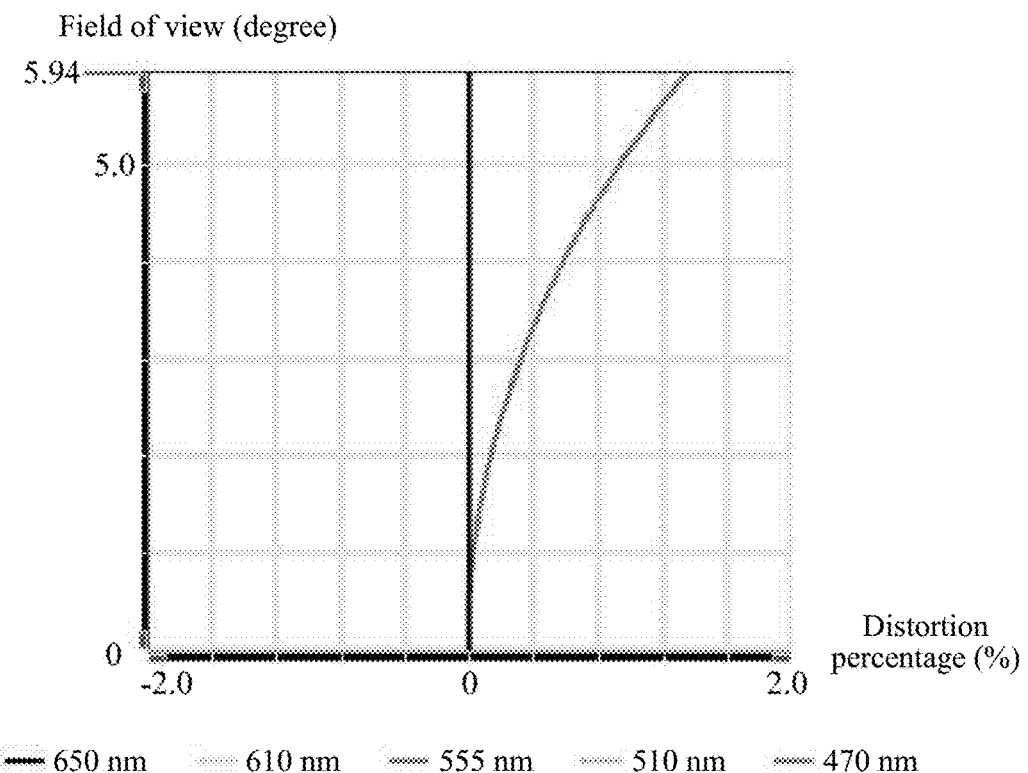
FIG. 3C is a distortion diagram of the image sensing device disclosed in the third embodiment of the present disclosure.

FIG. 3B and FIG. 3C are an astigmatic field curvature diagram and a distortion diagram of the image sensing device disclosed in the third embodiment of the present disclosure, referring to FIG. 3B and FIG. 3C together. A transverse axis in FIG. 3B is an offset between an imaging focus and a paraxial focal plane; and a longitudinal axis is a field of view of the imaging focus and the optical axis. FIG. 3B shows focus offsets of light with different wavelengths (650 nm, 610 nm, 555 nm, 510 nm, and 470 nm) on a tangential focal surface by using solid lines; and shows focus offsets of light with different wavelengths (650 nm, 610 nm, 555 nm, 510 nm, and 470 nm) on a sagittal focal surface by using dashed lines. A transverse axis in FIG. 3C is a distortion percentage; and a longitudinal axis is a field of view of the imaging focus and the optical axis. In this embodiment, a maximum field of view of imaging is 5.94 degrees, a tangential field curvature is 0.1094 mm, a sagittal field curvature is 0.0162 mm, and a maximum distortion is 1.3516%.

Figure 4A:
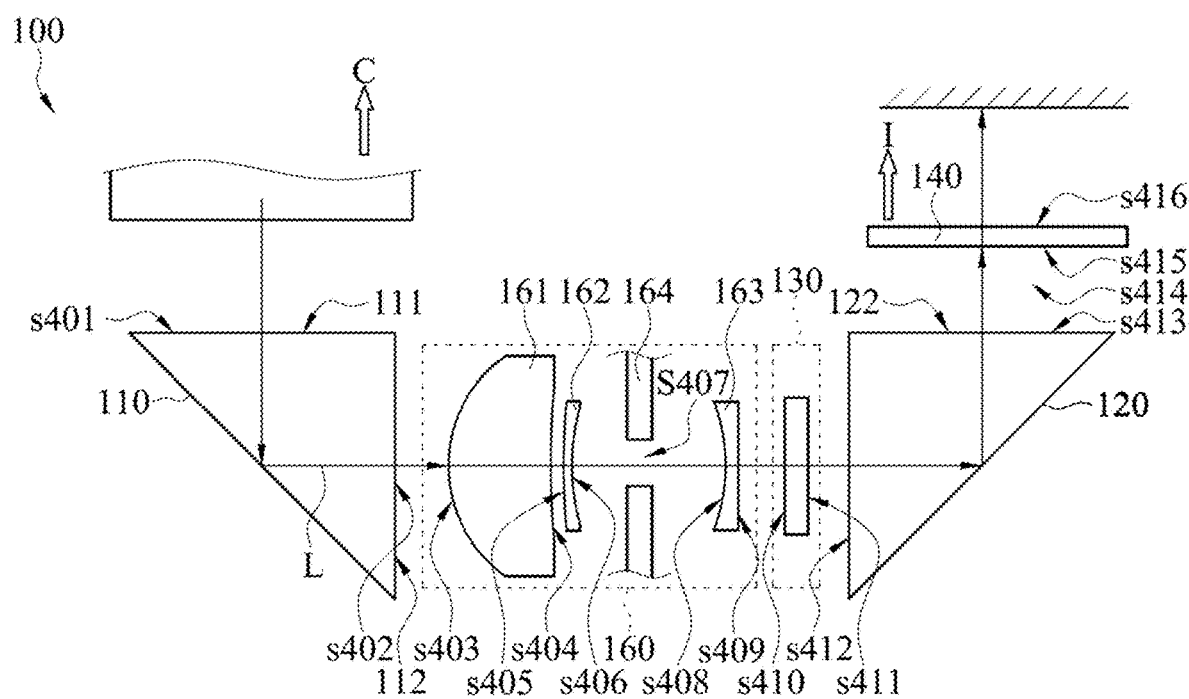
FIG. 4A is a schematic diagram of an image sensing device disclosed in a fourth embodiment of the present disclosure.

FIG. 4A is a schematic diagram of an image sensing device disclosed in a fourth embodiment of the present disclosure. Referring to FIG. 4A, the image sensing device 100 includes a first light path changing element 110, a second light path changing element 120, a plane lens 130, a lens group 160, and an image sensor 140. In the fourth embodiment, configurations of the first light path changing element 110, the second light path changing element 120, and the image sensor 140 are substantially the same as those in the first embodiment. In the fourth embodiment, both the plane lens 130 and the lens group 160 are located between the first light path changing element 110 and the second light path changing element 120, and both the plane lens 130 and the lens group 160 are located on the zoom optical axis L. For relative positions, the plane lens 130 may be disposed close to the first light path changing element 110, and the lens group 160 may be disposed close to the second light path changing element 120. Therefore, the plane lens 130 first performs high magnification zooming on light emergent from the first light-emergent side 112, and the lens group 160 then performs further focusing and zooming. Because a function of zooming a magnification is also achieved by the plane lens 130, one or more lenses of the lens group 160 only need to be shifted within a short stroke, thereby effectively reducing a production difficulty, and shortening a length of the image sensing device 100 on the zoom optical axis L. The foregoing relative position relationship is only an example, and the positions of the plane lens 130 and the lens group 160 may be arbitrarily changed. In the fourth embodiment, the lens 161 and the lens 162 are convex-concave lenses, and the lens 163 is a concave-convex lens. Table 4 is a lens parameter table of the image sensing device disclosed in the fourth embodiment of the present disclosure. Table 5 is a coefficient table of an aspheric formula of the image sensing device disclosed in the fourth embodiment of the present disclosure. Table 6 is a coefficient table of a Binary 2 surface phase formula of the plane lens disclosed in the fourth embodiment of the present disclosure. Refer to Table 4 to Table 6 together with the foregoing Formula 1 and Formula 2, to understand specifications of the image sensing device 100 in the fourth embodiment of the present disclosure.

Figure 4B:
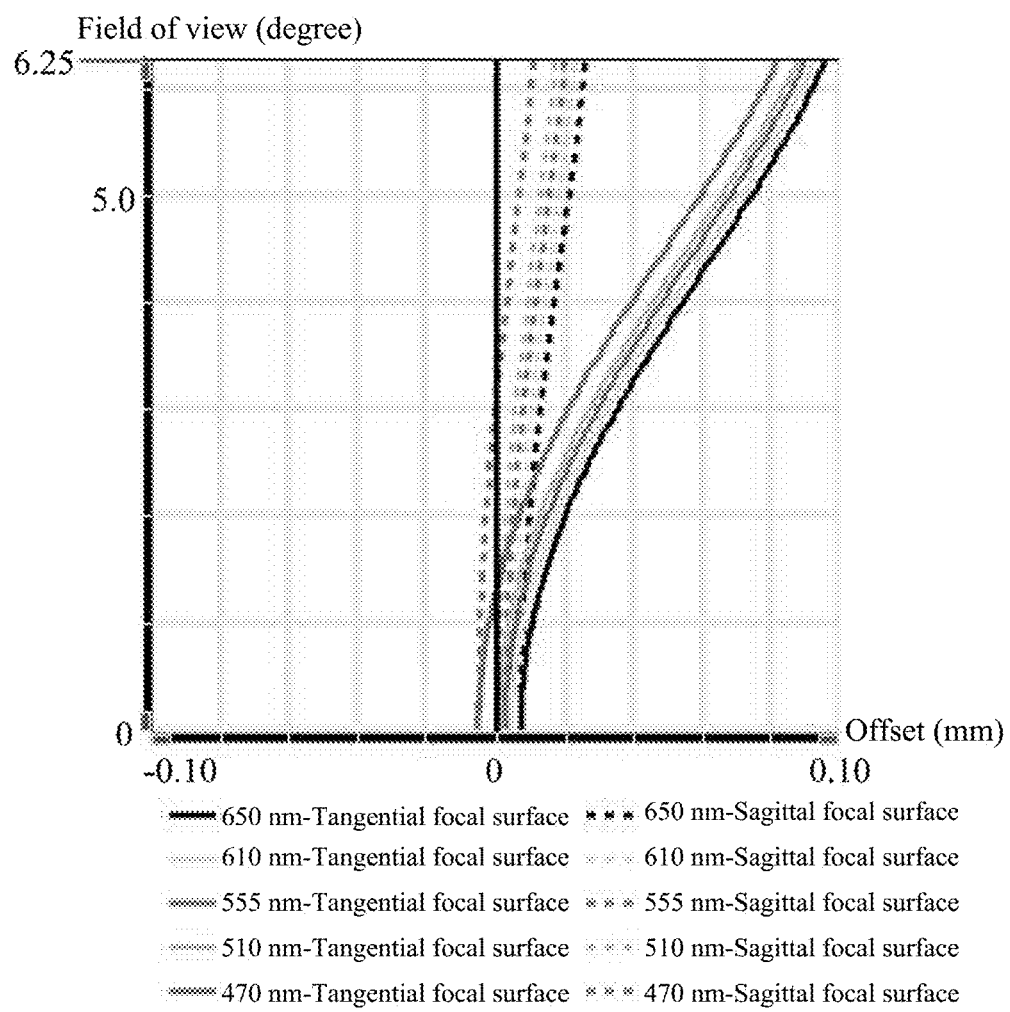
FIG. 4B is an astigmatic field curvature diagram of the image sensing device disclosed in the fourth embodiment of the present disclosure.
Figure 4C:
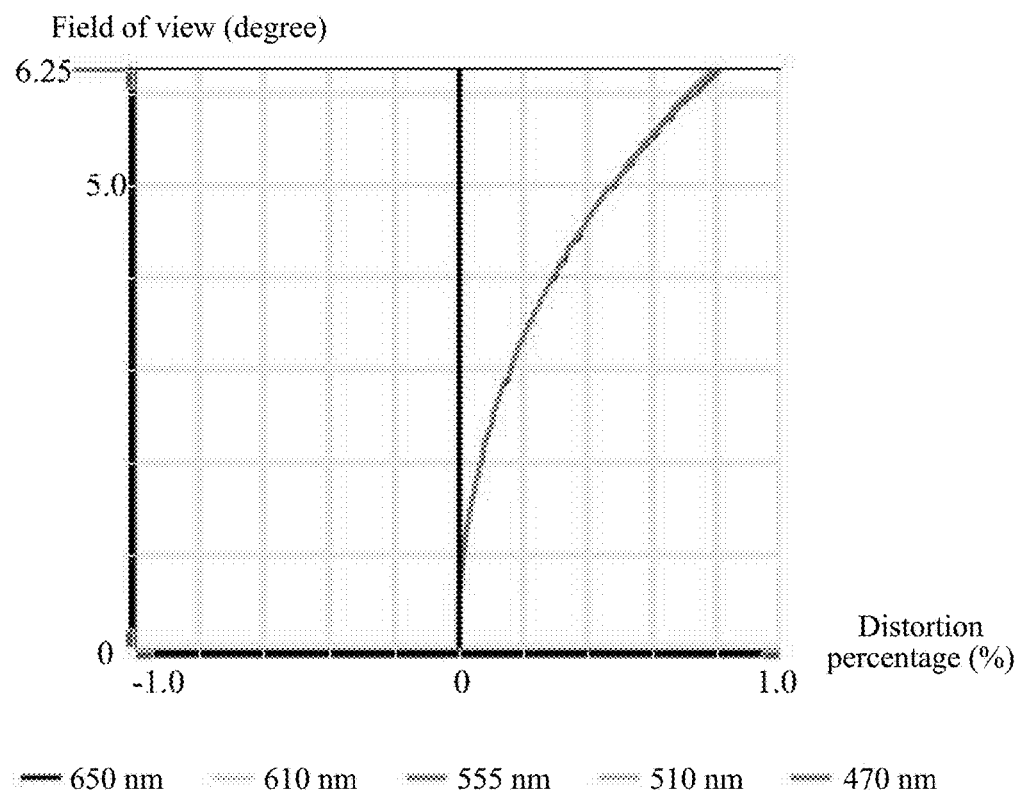
FIG. 4C is a distortion diagram of the image sensing device disclosed in the fourth embodiment of the present disclosure.

FIG. 4B and FIG. 4C are an astigmatic field curvature diagram and a distortion diagram of the image sensing device disclosed in the fourth embodiment of the present disclosure. FIG. 4B shows focus offsets of light with different wavelengths on a tangential focal surface by using solid lines; and shows focus offsets of light with different wavelengths on a sagittal focal surface by using dashed lines. In this embodiment, a maximum field of view of imaging is 6.57 degrees, a tangential field curvature is 0.0734 mm, a sagittal field curvature is 0.0102 mm, and a maximum distortion is 0.5981%.

Figure 5A:
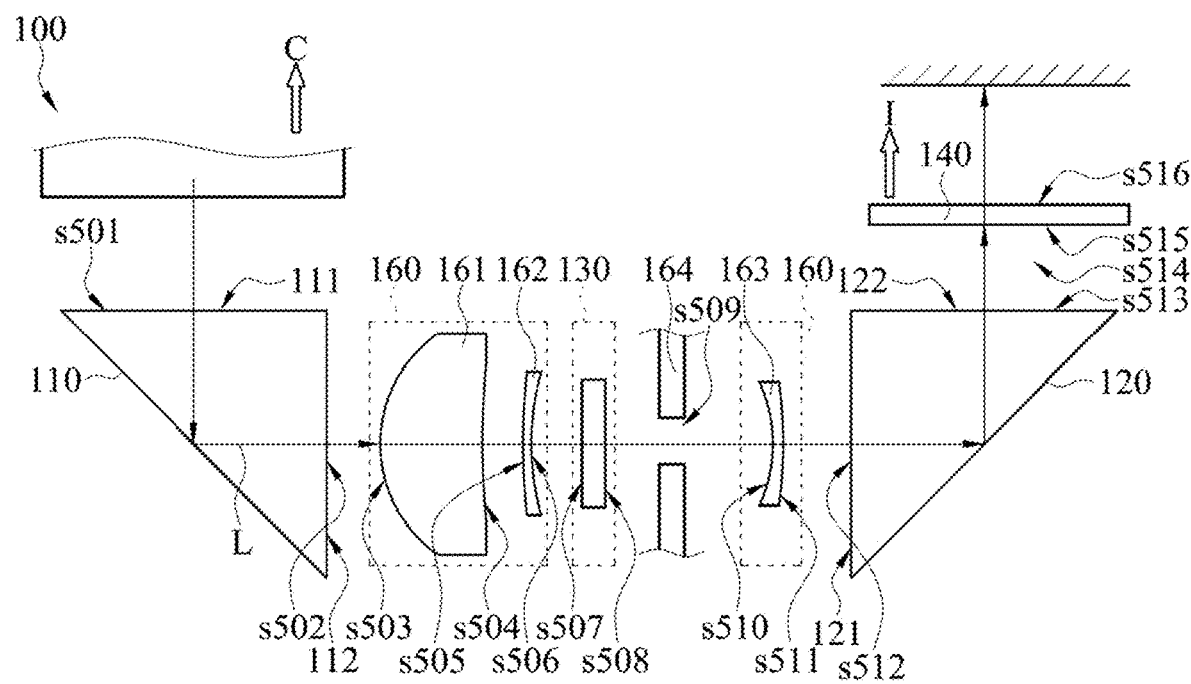
FIG. 5A is a schematic diagram of an image sensing device disclosed in a fifth embodiment of the present disclosure.

FIG. 5A is a schematic diagram of an image sensing device disclosed in a fifth embodiment of the present disclosure. Referring to FIG. 5A, in some embodiments, the plane lens 130 may alternatively be inserted between a plurality of lenses of lens groups 160. That is, the plane lens 130 is located between two lens groups 160, and each lens group 160 includes one or more lenses. For example, the plane lens 130 in the fifth embodiment is located between lenses 161 and 162 of a lens group 160 and a lens 163 of another lens group 160. Alternatively, the plane lens 130 may be located between a lens 161 of a lens group 160 and lenses 162 and 163 of another lens group 160 (not shown in the figure). In the fifth embodiment, the lens 161 and the lens 162 are convex-concave lenses, and the lens 163 is a concave-convex lens. Table 7 is a lens parameter table of the image sensing device disclosed in the fifth embodiment of the present disclosure. Table 8 is a coefficient table of an aspheric formula of the image sensing device disclosed in the fifth embodiment of the present disclosure. Table 9 is a coefficient table of a Binary 2 surface phase formula of the plane lens disclosed in the fifth embodiment of the present disclosure. Refer to Table 7 to Table 9 together with the foregoing Formula 1 and Formula 2, to understand specifications of the image sensing device 100 in the fifth embodiment of the present disclosure.

Figure 5B:
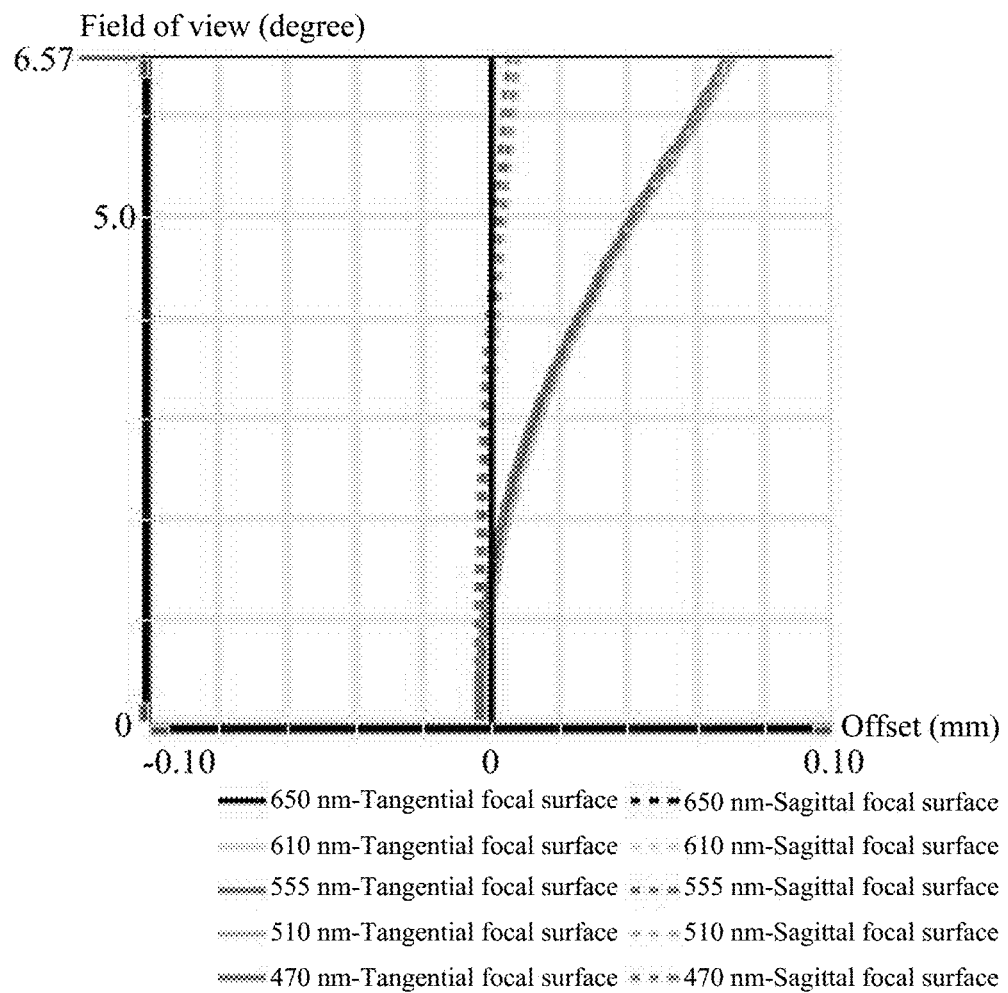
FIG. 5B is an astigmatic field curvature diagram of the image sensing device disclosed in the fifth embodiment of the present disclosure.
Figure 5C:
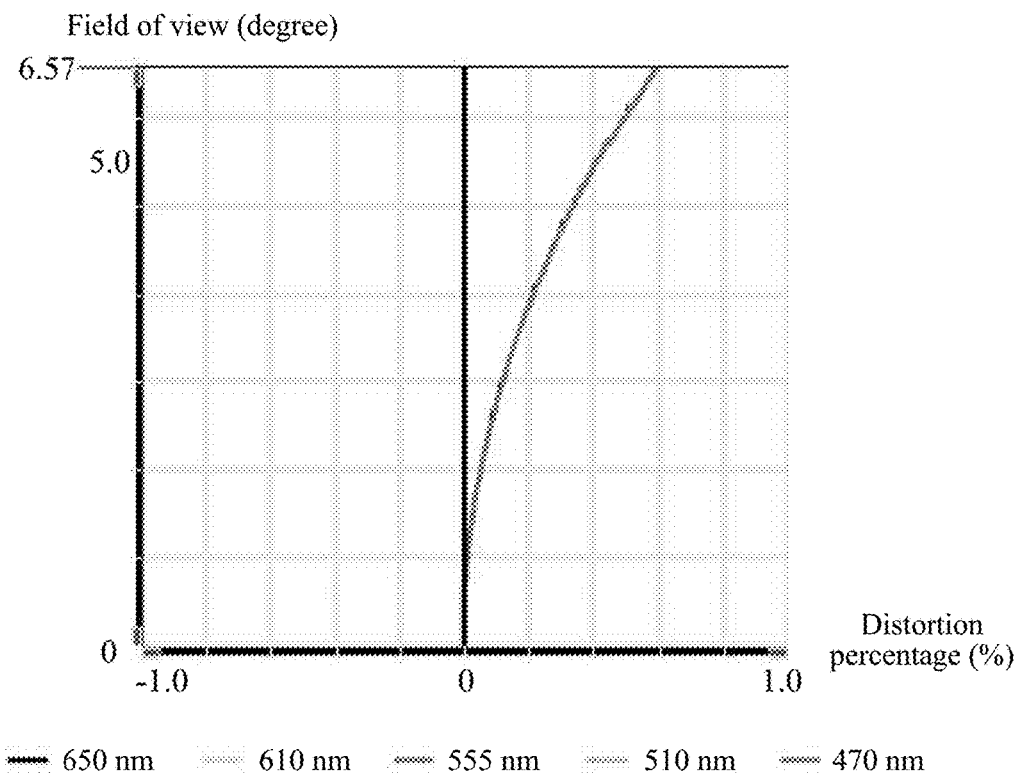
FIG. 5C is a distortion diagram of the image sensing device disclosed in the fifth embodiment of the present disclosure.

FIG. 5B and FIG. 5C are an astigmatic field curvature diagram and a distortion diagram of the image sensing device disclosed in the fifth embodiment of the present disclosure. FIG. 5B shows focus offsets of light with different wavelengths on a tangential focal surface by using solid lines; and shows focus offsets of light with different wavelengths on a sagittal focal surface by using dashed lines. In this embodiment, a maximum field of view of imaging is 6.57 degrees, a tangential field curvature is 0.0734 mm, a sagittal field curvature is 0.0102 mm, and a maximum distortion is 0.5981%.

Figure 6A:
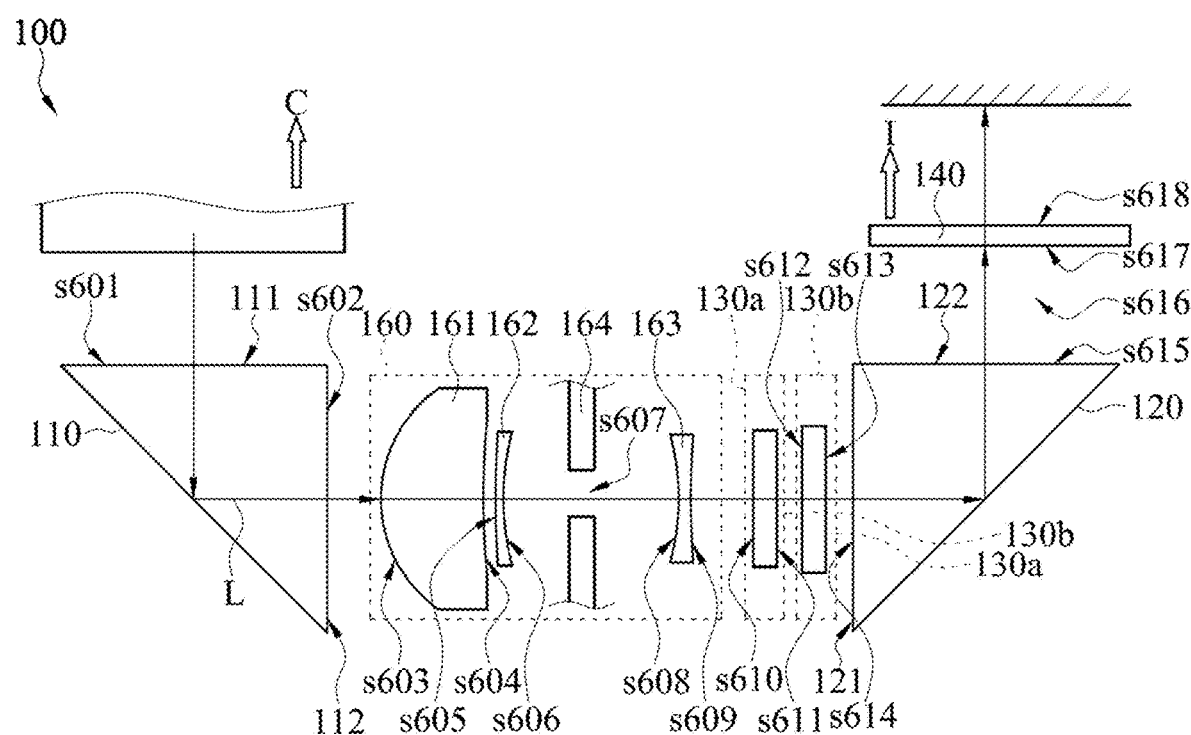
FIG. 6A is a schematic diagram of an image sensing device disclosed in a sixth embodiment of the present disclosure.

FIG. 6A is a schematic diagram of an image sensing device disclosed in a sixth embodiment of the present disclosure. Referring to FIG. 6A, in some embodiments, the image sensing device 100 may include a plurality of plane lenses, for example, two plane lenses 130a and 130b. The two plane lenses 130a and 130b may be in different forms. For example, one plane lens 130a is a metalens, and an other plane lens 130b is an MDL. The plurality of plane lenses 130a and 130b may perform a plurality of times of zooming, to avoid an image edge distortion caused by performing a single time of zooming with an excessively high magnification. Similarly, one or more lenses of the lens group 160 only need to be shifted within a short stroke to perform additional focusing and zooming, to overcome a disadvantage of a lens group with a long stroke. In the sixth embodiment, the lens 161 and the lens 162 are convex-concave lenses, the lens 163 is a biconcave lens, and both the plane lens 130a and the plane lens 130b are metalenses. Table 10 is a lens parameter table of the image sensing device disclosed in the sixth embodiment of the present disclosure. Table 11 is a coefficient table of an aspheric formula of the image sensing device disclosed in the sixth embodiment of the present disclosure. Table 12 is a coefficient table of a Binary 2 surface phase formula of the plane lens disclosed in the sixth embodiment of the present disclosure. Refer to Table 10 to Table 12 together with the foregoing Formula 1 and Formula 2, to understand specifications of the image sensing device 100 in the sixth embodiment of the present disclosure.

Figure 6B:
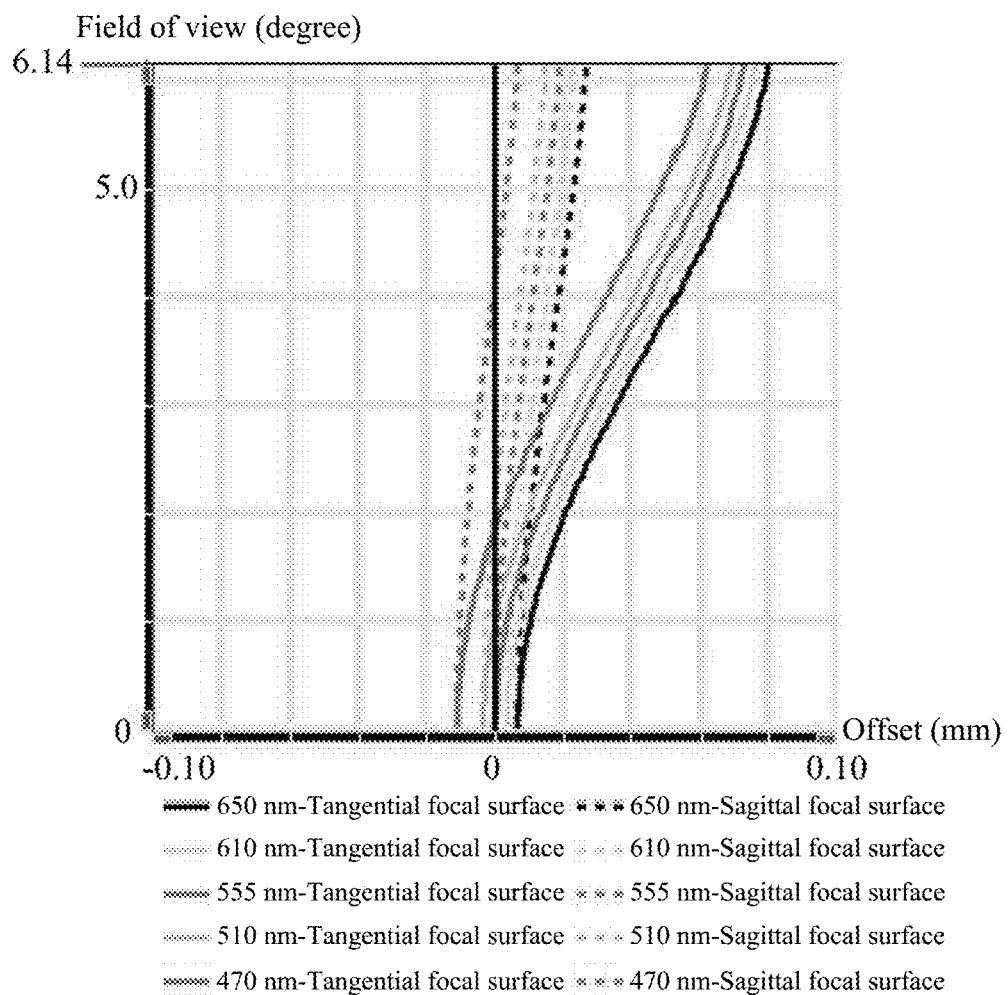
FIG. 6B is an astigmatic field curvature diagram of the image sensing device disclosed in the sixth embodiment of the present disclosure.
Figure 6C:
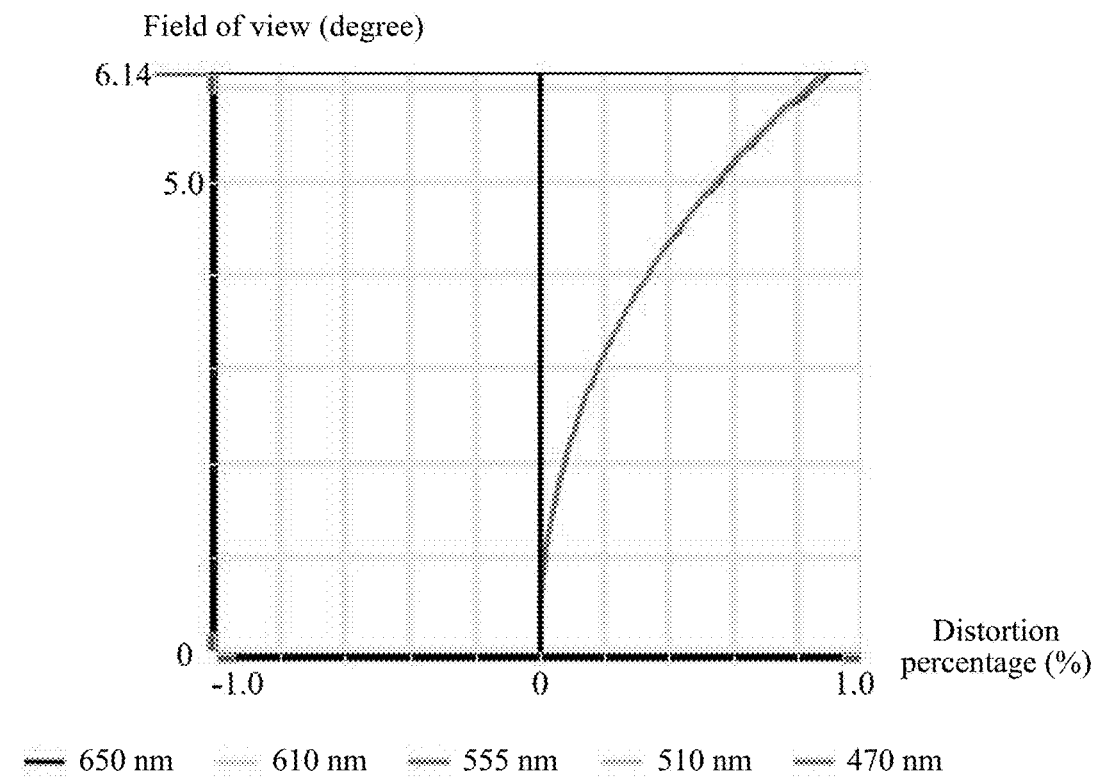
FIG. 6C is a distortion diagram of the image sensing device disclosed in the sixth embodiment of the present disclosure.

FIG. 6B and FIG. 6C are an astigmatic field curvature diagram and a distortion diagram of the image sensing device disclosed in the sixth embodiment of the present disclosure. FIG. 6B shows focus offsets of light with different wavelengths on a tangential focal surface by using solid lines; and shows focus offsets of light with different wavelengths on a sagittal focal surface by using dashed lines. In this embodiment, a maximum field of view of imaging is 6.14 degrees, a tangential field curvature is 0.0726 mm, a sagittal field curvature is 0.0190 mm, and a maximum distortion is 0.8914%.

Figure 7A:
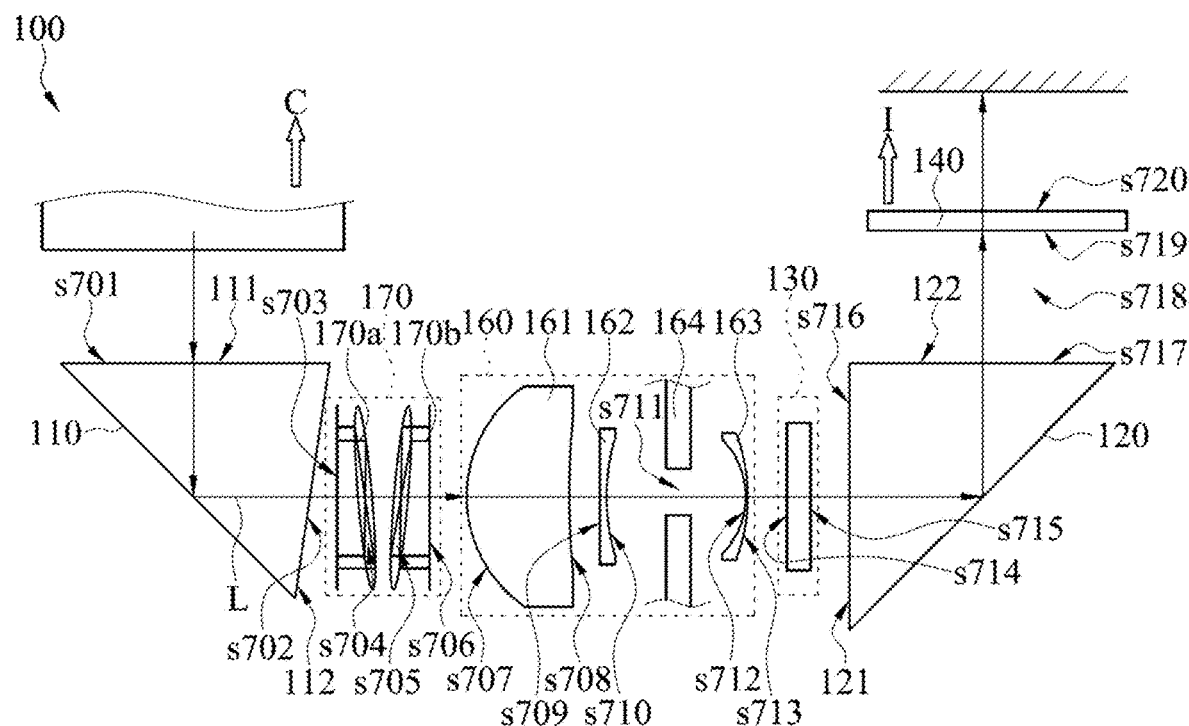
FIG. 7A is a schematic diagram of an image sensing device disclosed in a seventh embodiment of the present disclosure.
Figure 8:
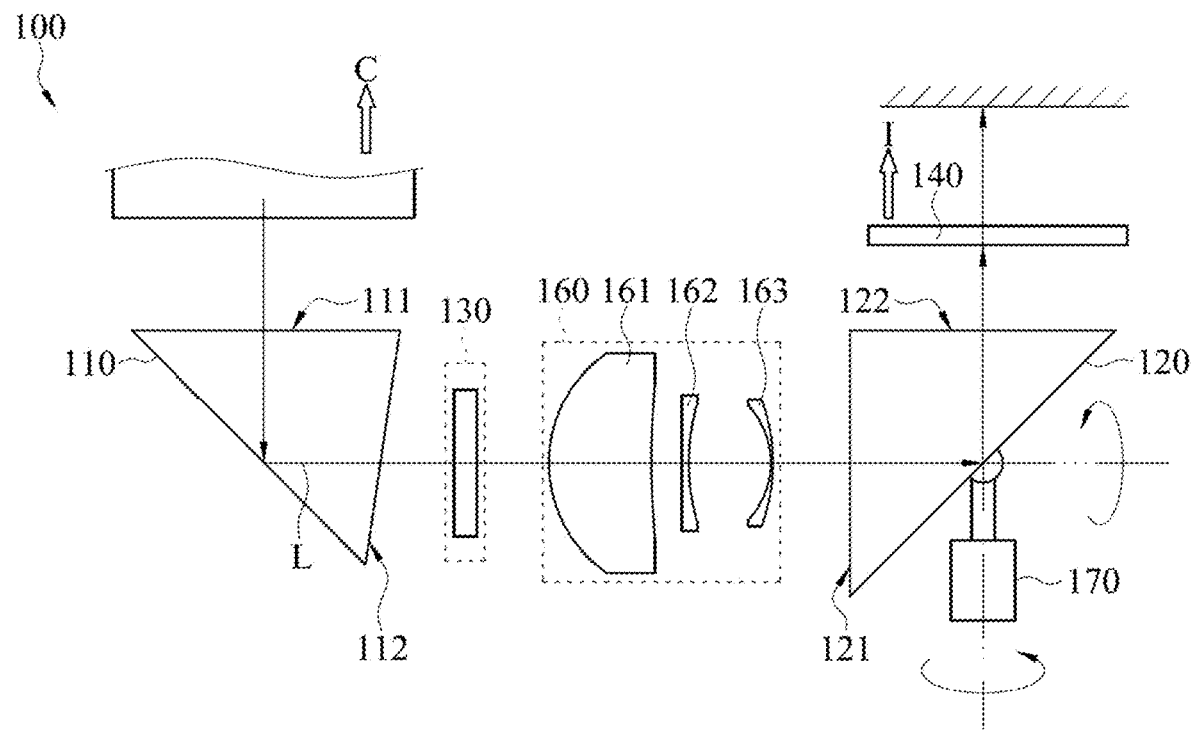
FIG. 8 is a schematic diagram of an image sensing device disclosed in an eighth embodiment of the present disclosure.
Figure 9:
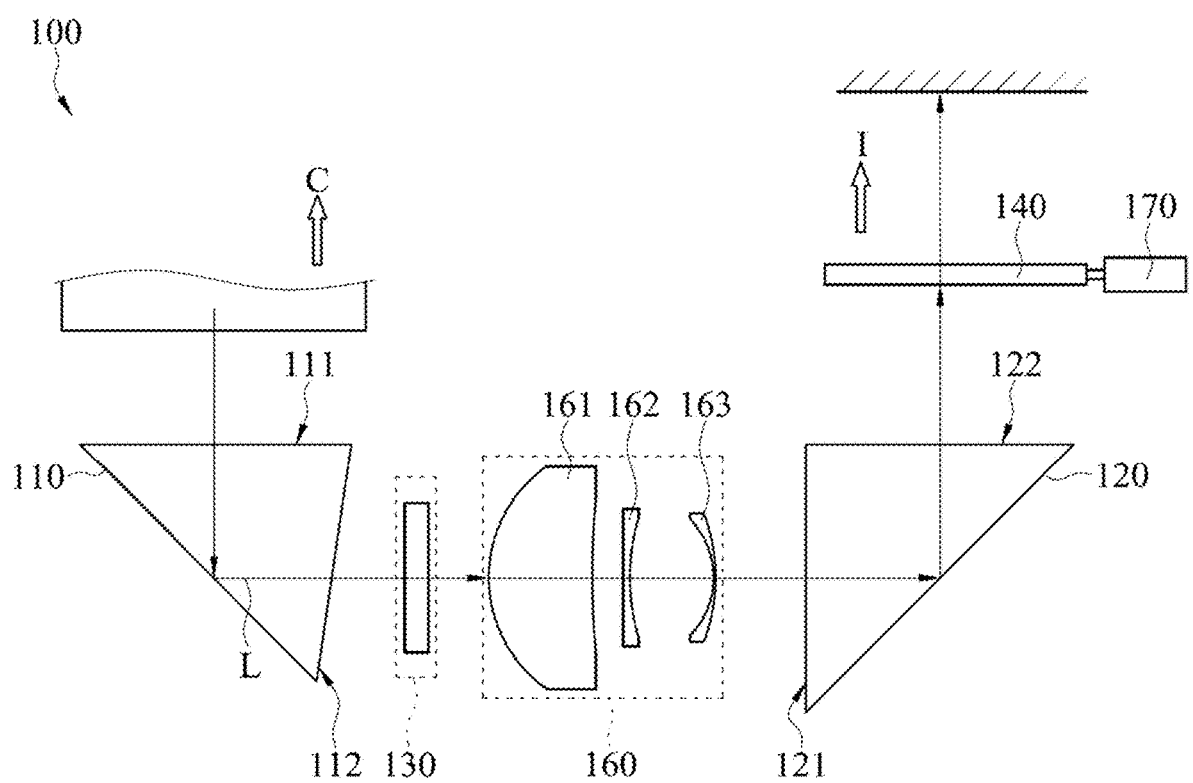
FIG. 9 is a schematic diagram of an image sensing device disclosed in a ninth embodiment of the present disclosure.

FIG. 7A, FIG. 8, and FIG. 9 show an image sensing device 100 according to some embodiments of the present invention. The image sensing device 100 further includes a vibration compensation element 170.

As shown in FIG. 7A, light is focused on the image sensor 140 through the first light path changing element 110, the vibration compensation element 170, the lens group 160, the plane lens 130, and the second light path changing element 120. The vibration compensation element 170 may be a vibration compensation lens group, configured to deflect light to adjust a landing point of a focal point on the image sensor 140 to achieve vibration compensation. The vibration compensation lens group may be located between the first light path changing element 110 and the second light path changing element 120, and corresponds to the first light-emergent side 112. In a seventh embodiment, the lens 161 and the lens 162 are convex-concave lenses, and the lens 163 is a concave-convex lens. Table 13 is a lens parameter table of an image sensing device disclosed in the seventh embodiment of the present disclosure. Table 14 is a coefficient table of an aspheric formula of the image sensing device disclosed in the seventh embodiment of the present disclosure. Table 15 is a coefficient table of a Binary 2 surface phase formula of the plane lens disclosed in the seventh embodiment of the present disclosure. Refer to Table 13 to Table 15 together with the foregoing Formula 1 and Formula 2, to understand specifications of the image sensing device 100 in the seventh embodiment of the present disclosure.

Figure 7B:
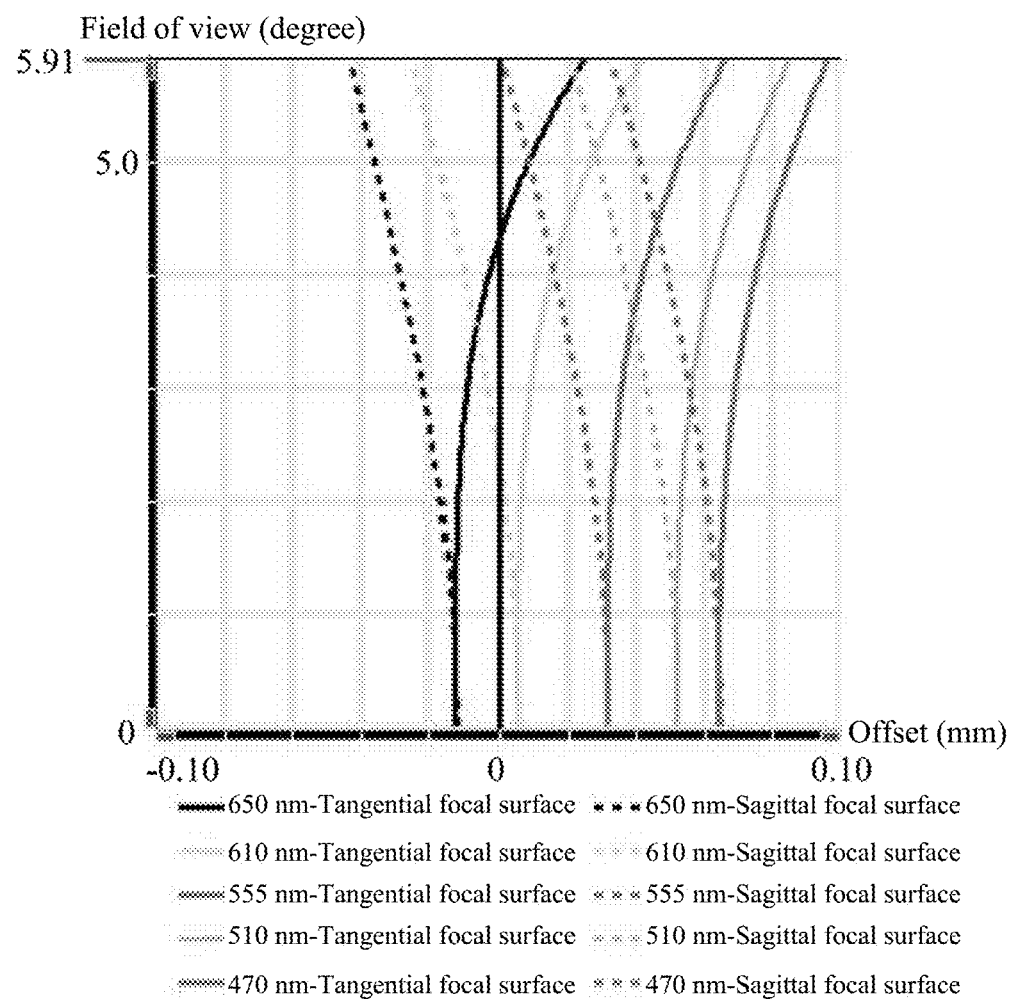
FIG. 7B is an astigmatic field curvature diagram of the image sensing device disclosed in the seventh embodiment of the present disclosure.
Figure 7C:
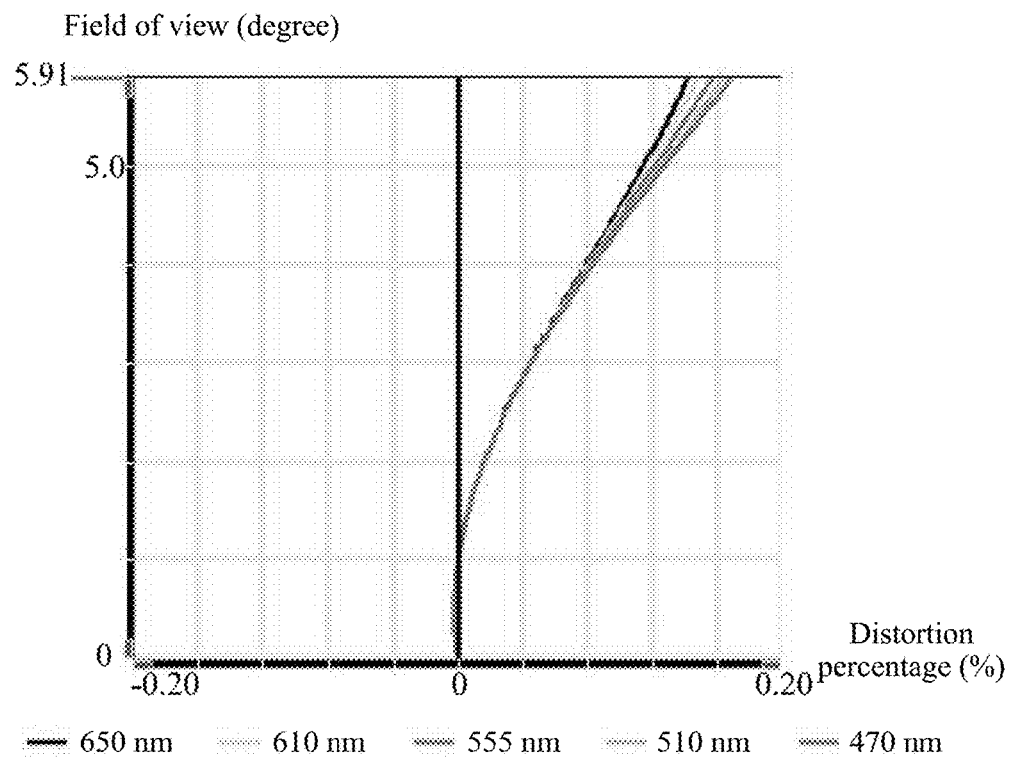
FIG. 7C is a distortion diagram of the image sensing device disclosed in the seventh embodiment of the present disclosure.

FIG. 7B and FIG. 7C are an astigmatic field curvature diagram and a distortion diagram of the image sensing device disclosed in the seventh embodiment of the present disclosure. FIG. 7B shows focus offsets of light with different wavelengths on a tangential focal surface by using solid lines; and shows focus offsets of light with different wavelengths on a sagittal focal surface by using dashed lines. In this embodiment, a maximum field of view of imaging is 5.91 degrees, a tangential field curvature is 0.0348 mm, a sagittal field curvature is 0.0310 mm, and a maximum distortion is 0.16%.

As shown in FIG. 8, the vibration compensation element 170 may be a multi-axis rotary actuator, is connected to the second light path changing element 120, and is configured to rotate the second light path changing element 120 in a multi-axial direction, to adjust a landing point of a focal point on the image sensor 140 to achieve vibration compensation.

As shown in FIG. 9, the vibration compensation element 170 may be a multi-axis translational actuator, is connected to the image sensor 140, and is configured to translate the image sensor 140 in a multi-axial direction, to adjust a landing point of a focal point on the image sensor 140 to achieve vibration compensation.

In summary, by using a characteristic of a short focal length of the plane lens 130 in the present disclosure, high magnification zooming may be completed within a short light path. Therefore, a distance between the first light path changing element 110 and the second light path changing element 120 may be effectively shortened; and the existing lens group 160 does not need to be configured to perform high magnification zooming, and one or more lenses of the lens group 160 only need to be shifted within a short stroke, thereby effectively reducing a production difficulty.

In the content recorded in this specification, when the terms "include", "comprise" or "have" are used, other elements, components, structures, areas, components, devices, systems, steps, connections, and the like may be additionally included unless otherwise stated, and other specifications shall not be excluded.

The features such as a proportional relationship, a structure, and a size shown in the figures of the present invention are only intended to describe the embodiments described in the present disclosure, to help a person of ordinary skill in the art to which the present invention belongs read and understand the present invention, are not intended to limit the scope of the claims of the present invention. In addition, any changes, modifications, or adjustments to the content recorded in the foregoing embodiments shall fall within the scope of the claims of the present invention, without affecting the inventive objectives and effects of the present disclosure.

TABLE 1 a lens parameter table of the image sensing device disclosed in the third embodiment of the present disclosure:

| Surface | Object | Curvature radius | Optical axis path length | Refraction coefficient | Dispersion coefficient |
|---|---|---|---|---|---|
| s301 | Plane lens 130 | — | 0.5 | 1.460 | 67.800 |
| s302 | — | — | 0.35 | — | — |
| s303 | First light path changing element 110 | Infinity | 5.800 | 1.85 | 23.79 |
| s304 | — | Infinity | 0.700 | — | — |
| s305 | Lens 161 | 2.922 | 2.250 | 1.540 | 56.000 |
| s306 | — | 455.122 | 0.285 | — | — |
| s307 | Lens 162 | 32.932 | 0.150 | 1.640 | 22.400 |
| s308 | — | 5.133 | 0.245 | — | — |
| s309 | Aperture stop 164 | Infinity | 2.377 | — | — |
| s310 | Lens 163 | −21.016 | 0.289 | 1.540 | 56.000 |
| s311 | — | 4.991 | 0.720 | — | — |
| s312 | Second light path changing element 120 | Infinity | 5.800 | 1.85 | 23.79 |
| s313 | — | Infinity | 0.200 | — | — |
| s314 | — | Infinity | 0.210 | 1.520 | 64.200 |
| s315 | — | Infinity | 0.200 | — | — |
| s316 | Image sensor 140 | — | — | — | — |

Note: The curvature radius and the optical axis path length are measured in mm.

TABLE 2 a coefficient table of an aspheric formula of an image sensing device disclosed in a third embodiment of the present disclosure:

| Surface | k | A4 | A6 | A8 | A10 |
|---|---|---|---|---|---|
| s305 | 0 | 5.08E−04 | 8.14E−05 | 4.17E−06 | −1.69E−07 |
| s306 | 0 | 9.58E−03 | −3.71E−03 | 8.17E−04 | −6.13E−05 |
| s307 | 0 | −2.24E−03 | −5.93E−04 | 2.23E−03 | −3.59E−04 |
| s308 | 0 | −3.07E−03 | 4.98E−03 | 1.86E−03 | 1.16E−04 |
| s310 | 0 | −5.15E−02 | 3.32E−02 | −2.44E−03 | −4.33E−04 |
| s311 | 0 | −4.66E−02 | 3.22E−02 | −4.47E−03 | 5.19E−04 |

TABLE 3 a coefficient table of a Binary 2 surface phase formula of a plane lens disclosed in the third embodiment of the present disclosure:

| Surface | Normalized curvature radius | $\rho^2$ | $\rho^4$ | $\rho^6$ | $\rho^8$ |
|---|---|---|---|---|---|
| s301 | 100 | −2.75E+05 | −4.17E+07 | −5.04E+10 | −1.17E+13 |
| s302 | 100 | 3.23E+05 | 9.08E+07 | −3.67E+09 | 3.06E+13 |

TABLE 4 a lens parameter table of an image sensing device disclosed in a fourth embodiment of the present disclosure:

| Surface | Object | Curvature radius | Optical axis path length | Refraction coefficient | Dispersion coefficient |
|---|---|---|---|---|---|
| s401 | First light path changing element 110 | Infinity | 5.800 | 1.85 | 23.79 |
| s402 | — | Infinity | 0.700 | — | — |
| s403 | Lens 161 | 2.922 | 2.250 | 1.540 | 56.000 |
| s404 | — | 455.122 | 0.285 | — | — |
| s405 | Lens 162 | 32.932 | 0.150 | 1.640 | 22.400 |
| s406 | — | 5.133 | 0.245 | — | — |
| s407 | Aperture stop 164 | Infinity | 2.377 | — | — |
| s408 | Lens 163 | −4.473 | 0.292 | 1.540 | 56.000 |
| s409 | — | 263.852 | 0.100 | — | — |
| s410 | Plane lens 130 | Infinity | 0.500 | 1.460 | 67.800 |
| s411 | — | Infinity | 0.200 | — | — |
| s412 | Second light path changing element 120 | Infinity | 5.800 | 1.85 | 23.79 |
| s413 | — | Infinity | 0.200 | — | — |
| s414 | — | Infinity | 0.210 | 1.520 | 64.200 |
| s415 | — | Infinity | 0.200 | — | — |
| s416 | Image sensor 140 | — | — | — | — |

Note: The curvature radius and the optical axis path length are measured in mm.

TABLE 5 a coefficient table of an aspheric formula of the image sensing device disclosed in the fourth embodiment of the present disclosure:

| Surface | k | A4 | A6 | A8 | A10 |
|---|---|---|---|---|---|
| s403 | 0 | 6.02E−04 | 8.19E−05 | 9.34E−07 | 2.21E−06 |
| s404 | 0 | 1.19E−02 | −3.26E−03 | 8.86E−04 | −1.22E−04 |
| s405 | 0 | −6.07E−04 | −4.20E−04 | 2.05E−03 | −4.58E−04 |
| s406 | 0 | −4.94E−03 | 4.35E−03 | 1.64E−03 | −1.37E−04 |
| s408 | 0 | −5.92E−02 | 3.32E−02 | −2.38E−03 | −3.30E−04 |
| s409 | 0 | −4.97E−02 | 3.01E−02 | −4.35E−03 | 5.14E−04 |

TABLE 6 a coefficient table of a Binary 2 surface phase formula of a plane lens disclosed in the fourth embodiment of the present disclosure:

| Surface | Normalized curvature radius | $\rho^2$ | $\rho^4$ | $\rho^6$ | $\rho^8$ |
|---|---|---|---|---|---|
| s410 | 5 | 7.46E+03 | 3.37E+04 | 5.97E+04 | −2.12E+06 |
| s411 | 5 | −7.18E+03 | −2.87E+04 | −2.63E+05 | 3.63E+06 |

TABLE 7 a lens parameter table of the image sensing device disclosed in the fifth embodiment of the present disclosure:

| Surface | Object | Curvature radius | Optical axis path length | Refraction coefficient | Dispersion coefficient |
|---|---|---|---|---|---|
| s501 | First light path changing element 110 | Infinity | 5.800 | 1.85 | 23.79 |
| s502 | — | Infinity | 0.700 | — | — |
| s503 | Lens 161 | 2.979 | 2.250 | 1.540 | 56.000 |
| s504 | — | −566.158 | 0.285 | — | — |
| s505 | Lens 162 | 22.587 | 0.150 | 1.640 | 22.400 |
| s506 | — | 4.970 | 0.245 | — | — |
| s507 | Plane lens 130 | Infinity | 0.500 | 1.460 | 67.800 |
| s508 | — | Infinity | 0.200 | — | — |
| s509 | Aperture stop 164 | Infinity | 2.041 | — | — |
| s510 | Lens 163 | −3.434 | 0.234 | 1.540 | 56.000 |
| s511 | — | −15.586 | 0.245 | — | — |
| s512 | Second light path changing element 120 | Infinity | 5.800 | 1.85 | 23.79 |
| s513 | — | Infinity | 0.200 | — | — |
| s514 | — | Infinity | 0.210 | 1.520 | 64.200 |
| s515 | — | Infinity | 0.200 | — | — |
| s516 | Image sensor 140 | — | — | — | — |

Note: The curvature radius and the optical axis path length are measured in mm.

TABLE 8 a coefficient table of an aspheric formula of the image sensing device disclosed in the fifth embodiment of the present disclosure:

| Surface | k | A4 | A6 | A8 | A10 |
|---|---|---|---|---|---|
| s503 | 0 | 4.12E−04 | 8.14E−05 | −9.32E−06 | 2.73E−06 |
| s504 | 0 | 1.17E−02 | −3.23E−03 | 8.96E−04 | −1.15E−04 |
| s505 | 0 | −3.16E−05 | −3.20E−04 | 2.06E−03 | −4.69E−04 |
| s506 | 0 | −5.18E−03 | 4.29E−03 | 1.52E−03 | −1.90E−04 |
| s510 | 0 | −5.97E−02 | 3.21E−02 | −2.98E−03 | −4.54E−04 |
| s511 | 0 | −5.08E−02 | 2.98E−02 | −4.59E−03 | 1.94E−04 |

TABLE 9 a coefficient table of a Binary 2 surface phase formula of a plane lens disclosed in the fifth embodiment of the present disclosure:

| Surface | Normalized curvature radius | $\rho^2$ | $\rho^4$ | $\rho^6$ | $\rho^8$ |
|---|---|---|---|---|---|
| s507 | 1.00E+02 | 4.30E+05 | 6.26E+07 | −3.15E+12 | −3.54E+15 |
| s508 | 1.00E+02 | −3.08E+05 | 3.41E+08 | 1.33E+12 | 2.65E+16 |

TABLE 10 a lens parameter table of an image sensing device disclosed in a sixth embodiment of the present disclosure:

| Surface | Object | Curvature radius | Optical axis path length | Refraction coefficient | Dispersion coefficient |
|---|---|---|---|---|---|
| s601 | First light path changing element 110 | Infinity | 5.800 | 1.85 | 23.79 |
| s602 | — | Infinity | 0.700 | — | — |
| s603 | Lens 161 | 2.949 | 2.250 | 1.540 | 56.000 |
| s604 | — | 175.377 | 0.285 | — | — |
| s605 | Lens 162 | 76.715 | 0.150 | 1.640 | 22.400 |
| s606 | — | 5.807 | 0.245 | — | — |
| s607 | Aperture stop 164 | Infinity | 2.144 | — | — |
| s608 | Lens 163 | −6.347 | 0.284 | 1.540 | 56.000 |
| s609 | — | 20.401 | 0.100 | — | — |
| s610 | Plane lens 130a | Infinity | 0.500 | 1.460 | 67.800 |
| s611 | — | Infinity | 0.200 | — | — |
| s612 | Plane lens 130b | Infinity | 0.500 | 1.460 | 67.800 |
| s613 | — | Infinity | 0.200 | — | — |
| s614 | Second light path changing element 120 | Infinity | 5.800 | 1.85 | 23.79 |
| s615 | — | Infinity | 0.200 | — | — |
| s616 | — | Infinity | 0.210 | 1.520 | 64.200 |
| s617 | — | Infinity | 0.200 | — | — |
| s618 | Image sensor 140 | — | — | — | — |

Note: The curvature radius and the optical axis path length are measured in mm.

TABLE 11 a coefficient table of an aspheric formula of the image sensing device disclosed in the sixth embodiment of the present disclosure:

| Surface | k | A4 | A6 | A8 | A10 |
|---|---|---|---|---|---|
| s607 | 0 | 8.06E−04 | 1.14E−04 | −2.01E−07 | 3.22E−06 |
| s608 | 0 | 1.26E−02 | −3.49E−03 | 1.02E−03 | −1.43E−04 |
| s609 | 0 | −5.74E−04 | −9.24E−05 | 2.32E−03 | −4.93E−04 |
| s610 | 0 | −6.16E−03 | 5.44E−03 | 1.45E−03 | −7.96E−06 |
| s612 | 0 | −5.82E−02 | 3.11E−02 | −1.26E−03 | −5.17E−04 |
| s613 | 0 | −4.96E−02 | 3.08E−02 | −4.39E−03 | 5.27E−04 |

TABLE 12 a coefficient table of a Binary 2 surface phase formula of a plane lens disclosed in the sixth embodiment of the present disclosure:

| Surface | Normalized curvature radius | $\rho^2$ | $\rho^4$ | $\rho^6$ | $\rho^8$ |
|---|---|---|---|---|---|
| s614 | 5 | 2.16E+03 | −1.92E+03 | 5.83E+04 | 2.29E+05 |
| s615 | 5 | −3.47E+03 | −2.81E+03 | 2.02E+04 | −3.65E+05 |
| s616 | 5 | 7.46E+03 | 3.37E+04 | 5.97E+04 | −2.12E+06 |
| s617 | 5 | −5.85E+03 | −2.60E+04 | −2.53E+05 | 3.13E+06 |

TABLE 13 a lens parameter table of an image sensing device disclosed in a seventh embodiment of the present disclosure:

| Surface | Object | Curvature radius | Optical axis path length | Refraction coefficient | Dispersion coefficient |
|---|---|---|---|---|---|
| s701 | First light path changing element 110 | Infinity | 5.800 | 1.7 | 59.05 |
| s702 | — | Infinity | 0.700 | — | — |
| s703 | Vibration compensation element 170a | Infinity | 0.600 | 1.7 | 59.05 |
| s704 | — | Infinity | 0.800 | — | — |
| s705 | Vibration compensation element 170b | Infinity | 0.600 | 1.7 | 59.05 |
| s706 | — | Infinity | 0.800 | — | — |
| s707 | Lens 161 | 2.803 | 2.253 | 1.540 | 56.000 |
| s708 | — | −63.100 | 0.285 | — | — |
| s709 | Lens 162 | 36.683 | 0.150 | 1.640 | 22.400 |
| s710 | — | 4.545 | 0.245 | — | — |
| s711 | Aperture stop 164 | Infinity | 2.507 | — | — |
| s712 | Lens 163 | −2.022 | 0.150 | 1.540 | 56.000 |
| s713 | — | −5.516 | 0.100 | — | — |
| s714 | Plane lens 130 | Infinity | 0.500 | 1.460 | 67.800 |
| s715 | — | Infinity | 0.200 | — | — |
| s716 | Second light path changing element 120 | Infinity | 5.800 | 1.85 | 23.79 |
| s717 | — | Infinity | 0.200 | — | — |
| s718 | — | Infinity | 0.210 | 1.520 | 64.200 |
| s719 | — | Infinity | 0.200 | — | — |
| s720 | Image sensor 140 | — | — | — | — |

Note: The curvature radius and the optical axis path length are measured in mm.

TABLE 14 a coefficient table of an aspheric formula of the image sensing device disclosed in the seventh embodiment of the present disclosure:

| Surface | k | A4 | A6 | A8 | A10 |
|---|---|---|---|---|---|
| s707 | 0 | −3.24E−04 | 2.35E−07 | −1.17E−05 | 4.88E−07 |
| s708 | 0 | 1.06E−02 | −3.83E−03 | 7.01E−04 | −4.61E−05 |
| s709 | 0 | −1.98E−04 | −4.72E−03 | 1.65E−03 | −1.53E−04 |
| s710 | 0 | −6.27E−03 | 1.10E−03 | 1.45E−04 | 1.86E−04 |
| s712 | 0 | −5.83E−02 | 2.81E−02 | 1.52E−03 | −3.52E−03 |
| s713 | 0 | −5.47E−02 | 3.43E−02 | −7.95E−03 | 1.95E−04 |

TABLE 15 a coefficient table of a Binary 2 surface phase formula of a plane lens disclosed in the seventh embodiment of the present disclosure:

| Surface | Normalized curvature radius | $\rho^2$ | $\rho^4$ | $\rho^6$ | $\rho^8$ |
|---|---|---|---|---|---|
| s714 | 5 | −6.20E+03 | −1.58E+04 | −5.73E+02 | 1.00E+05 |
| s715 | 5 | 6.85E+03 | 7.34E+03 | 1.72E+05 | −9.59E+05 |

What is claimed is:

1. A light path changing device, comprising:
a first light path changing element, comprising a first light-incident side and a first light-emergent side, wherein the first light-incident side faces a first optical path, the first light-emergent side faces a second optical path, and there is a first angle between the first light-incident side and the first light-emergent side;
a second light path changing element, comprising a second light-incident side and a second light-emergent side, wherein the second light-incident side faces the second optical path, so that the first light-emergent side and the second light-incident side are disposed opposite to each other along the second optical path; the second light-emergent side faces a third optical path, and there is a second angle between the second light-incident side and the second light-emergent side; and a light path sequentially passes through the first light-incident side, the first light-emergent side, the second light-incident side, and the second light-emergent side; and
a plane lens, disposed on the light path;
wherein the plane lens is a metalens or a multi-level diffractive lens (MDL), and there are a plurality of plane lenses, one of the plurality of plane lenses is a metalens, and another one of the plurality of plane lenses is an MDL.

2. The light path changing device according to claim 1, wherein the first light path changing element is a first prism, comprising a first light-incident surface and a first light-emergent surface, wherein the first light-incident side is the first light-incident surface of the first prism, and the first light-emergent side is the first light-emergent surface of the first prism; and/or
the second light path changing element is a second prism, comprising a second light-incident surface and a second light-emergent surface, wherein the second light-incident side is the second light-incident surface of the second prism, and the second light-emergent side is the second light-emergent surface of the second prism.

3. The light path changing device according to claim 1, wherein the first light path changing element is a first reflector, which is disposed at an angle to the first optical path and is disposed at an angle to the second optical path; and/or
the second light path changing element is a second reflector, which is disposed at an angle to the third optical path and is disposed at an angle to the second optical path.

4. The light path changing device according to claim 1, wherein the first light path changing element comprises a first light-incident surface and a first light-emergent surface, and the plurality of plane lenses are disposed corresponding to the first light-incident surface.

5. The light path changing device according to claim 4, further comprising: a lens group, located between the first light path changing element and the second light path changing element.

6. The light path changing device according to claim 1, wherein the plurality of plane lenses are located between the first light path changing element and the second light path changing element, and the second optical path passes through the plurality of plane lenses.

7. The light path changing device according to claim 6, further comprising: a focusing mechanism, connected to the plurality of plane lenses, and configured to drive the plurality of plane lenses to move along the second optical path.

8. The light path changing device according to claim 6, further comprising: a lens group, located between the first light path changing element and the second light path changing element.

9. The light path changing device according to claim 8, wherein the plurality of plane lenses are located between a plurality of lenses of the lens group.

10. The light path changing device according to claim 1, further comprising: an image sensor, disposed corresponding to the second light-emergent side.

11. The light path changing device according to claim 10, further comprising: a vibration compensation element, wherein the first light path changing element, the second light path changing element, and the plurality of plane lenses together form a focal point, and the vibration compensation element is configured to adjust a landing point of the focal point on the image sensor.

12. The light path changing device according to claim 11, wherein the vibration compensation element is a vibration compensation lens group, is disposed on the light path, and is configured to deflect light to adjust the landing point of the focal point on the image sensor.

13. The light path changing device according to claim 11, wherein the vibration compensation element is a multi-axis rotary actuator, is connected to the second light path changing element, and is configured to rotate the second light path changing element in a multi-axial direction.

14. The light path changing device according to claim 11, wherein the vibration compensation element is a multi-axis translational actuator, is connected to the image sensor, and is configured to translate the image sensor in a multi-axial direction.

* * * * *